United States Patent
Dabby et al.

[11] 3,891,302
[45] June 24, 1975

[54] METHOD OF FILTERING MODES IN OPTICAL WAVEGUIDES

[75] Inventors: Franklin Winston Dabby, Ewing Twsp.; Ami Kestenbaum, East Windsor Twsp., Mercer County, both of N.J.

[73] Assignee: Western Electric Company, Inc., New York, N.Y.

[22] Filed: Sept. 28, 1973

[21] Appl. No.: 401,731

[52] U.S. Cl. .......................... 350/96 WG; 350/96 R
[51] Int. Cl. ............................................. G02b 5/14
[58] Field of Search ...................... 350/96 WG, 96 C

[56] References Cited
UNITED STATES PATENTS
3,723,921  3/1973  Rowe et al. ............... 350/96 WG X
3,760,292  9/1973  Kogelnik et al. ........ 350/96 WG UX OTHER PUBLICATIONS
Dabby et al., "High–Frequency Cutoff Periodic Dielectric Waveguides," Applied Physics Letters, Vol. 22, No. 4, Feb. 1973, pp. 190–191.

Elachi et al., "Periodic Structures in Integrated Optics," J. Appl. Phys., Vol. 44, No. 7, July 1973, pp. 3146–3152.

*Primary Examiner*—John K. Corbin
*Attorney, Agent, or Firm*—Geoffrey D. Green; B. W. Sheffield; J. L. Stavert

[57] ABSTRACT

Modes are filtered in an optical waveguide by selecting and providing a periodic variation, such as a surface corrugation or a refractive index variation, in a filter region in the waveguide. The filter region diverts light in an unwanted mode from the propagation axis by scattering or reflection. Both planar waveguide filters and fiber-optic filters are disclosed.

32 Claims, 9 Drawing Figures

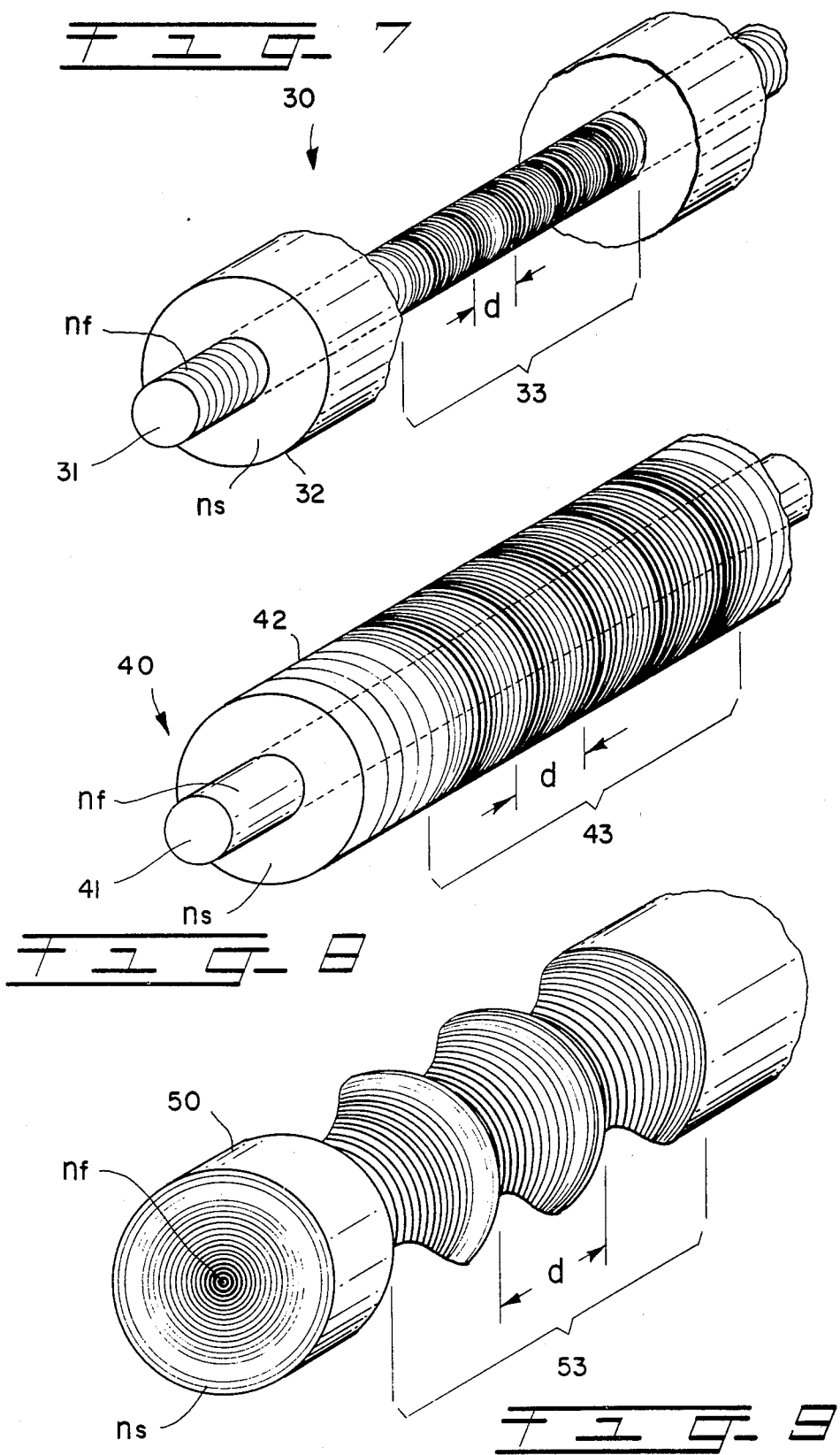

METHOD OF FILTERING MODES IN OPTICAL WAVEGUIDES

BACKGROUND OF THE INVENTION

1. Field of the Invention

Broadly speaking, this invention relates to optical devices. More specifically, the invention relates to method for providing optical waveguide sections having mode filtering properties.

2. Discussion of the Prior Art

Optical communications systems use optical analogs of such well-known devices as waveguides, filters, amplifiers, etc. Different modes of propagation of light energy occur in optical waveguides. A mode of propagation can refer to the polarization of a beam of light being propagated, and to the number of reflections of the beam from the walls of the waveguide in a given length of waveguide. Examples of typical nomenclature for modes are $TE_0, TE_1, \ldots, TE_n; TM_0, TM_1, \ldots, TM_n$; where TE and TM refer to transverse electric and transverse magnetic polarizations, respectively; and the subscripts are mode numbers referring to the number of reflections. The lower the subscript number, the fewer the reflections of a particular beam along a given length of waveguide. The dimensions and refractive indexes of a waveguide determine the particular modes that it will propagate.

Inadvertent variations in dimension or refractive index along a propagation path in a waveguide can cause energy to be transferred from one mode to another. In an optical communications system, such energy transfer in the component optical waveguides can lead to the generation of spurious modes that must be suppressed. Therefore, it is necessary to insert filters in the optical waveguides to divert or absorb the energy being propagated in unwanted modes.

Prior art polarization mode filters have been fabricated using metal films in conjunction with optical films in optical waveguides. Such a device filters by attenuating TM waves more strongly than TE waves. However, the metallic layer results in losses to the TE wave that may lead to unacceptable insertion loss for the filter. Other approaches to the problem are, therefore, desirable.

A copending application Ser. No. 385,270, filed July 3, 1973, and assigned to the assignee of this application, discloses apparatus for frequency filtering in optical waveguides. This apparatus comprises a two-component optical waveguide having a layer of optical material supported on a substrate, the optical layer having a periodic variation in the refractive index, or a corrugated surface, in a filtering region. Light energy of unwanted frequencies is diverted from the propagation axis in the filtering region and scattered out of the waveguide. The period of the refractive index variation, or the corrugation, determines the frequencies of light energy that will be scattered. By appropriate choice or parameters, various types of filters such as band pass, low pass, or high pass, can be achieved. For the frequencies that are passed without scattering, these filters have an acceptably low insertion loss.

SUMMARY OF THE INVENTION

We have discovered that optical waveguides having filter regions wherein a portion of the waveguide is fabricated with periodic variations can be used for mode filters having low insertion loss. The period of the variation is chosen to divert light energy being propagated in the waveguide in unwanted modes. Methods of filtering modes are described in which the surface of a waveguide is corrugated periodically to achieve a mode filter. Other methods are described in which a refractive index of a portion of the waveguide is varied periodically. Methods for use with planar waveguides and fiber-optic waveguides are disclosed.

The invention will be more fully understood from the following description and the attached drawings.

DESCRIPTION OF THE DRAWINGS

FIGS. 7, 8 and 9 are isometric views of other embodiments of the invention using fiber optics.

DETAILED DESCRIPTION

Figure 1:
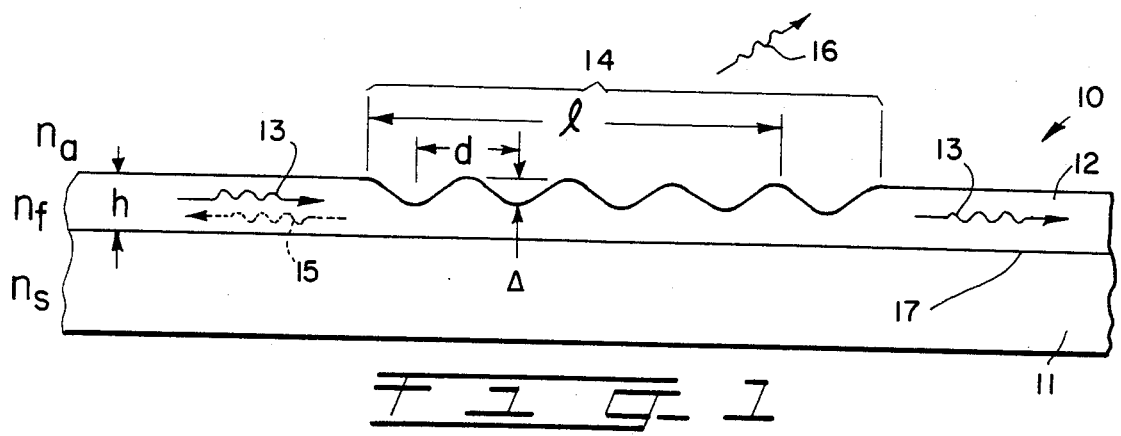
FIG. 1 is a cross-sectional view of a two-component planar optical waveguide having a mode filter section comprising a corrugated overlying layer, according to the invention.

FIG. 1 illustrates an embodiment of the invention in which a portion of a two-component optical waveguide comprises a mode filtering region. Planar optical waveguide 10, of indefinite length, comprises as a first component isotropic substrate 11 and as a second component isotropic optical layer 12. Light energy having a wavelength λ is propagated along the waveguide as indicated by arrows 13. The waveguide is assumed to be surrounded by a medium such as air. The refractive indexes $n_s$, $n_f$, and $n_a$ pertain to substrate 11, optical layer 12, and the surrounding medium, respectively. As is well known, for waveguide 10 to function, $n_f > n_a$ and $n_f > n_s$, and most of the light energy propagates in the region where the refractive index is highest.

Light energy in a given mode is propagated in a field unique to that mode. Theoretically, the field for each mode extends infinitely outside the waveguide. Practically speaking, however, the propagating fields can be said to substantially exist in the regions where the refractive index is highest. The effective refractive index, $n_e$, of the waveguide can be found for each mode of propagation in the waveguide. This parameter can best be determined for each mode by measuring it in the waveguide, an accurate theoretical determination being difficult in practice. However, for a given wavelength, λ, of propagated light, the parameter $n_e$ is known to be a function of $n_a$, $n_f$, $n_s$, and the thickness $h$ of optical layer 12.

In filter region 14, a periodic variation is formed in optical layer 12 wherein the surface of optical layer 12 is corrugated along the propagation axis of the waveguide over a length $l$, the corrugations having a period $d$ and an amplitude $\Delta$. Alternatively, the interface surface 17 between optical layer 12 and substrate 11 could be corrugated instead of the top surface of optical layer 12. The light transmission characteristics of the filter region depend on several factors, such as the parameters $e$, $d$, $\Delta$, and $h$. However, the most significant change in transmission characteristics results from a change in period $d$.

Figure 2:
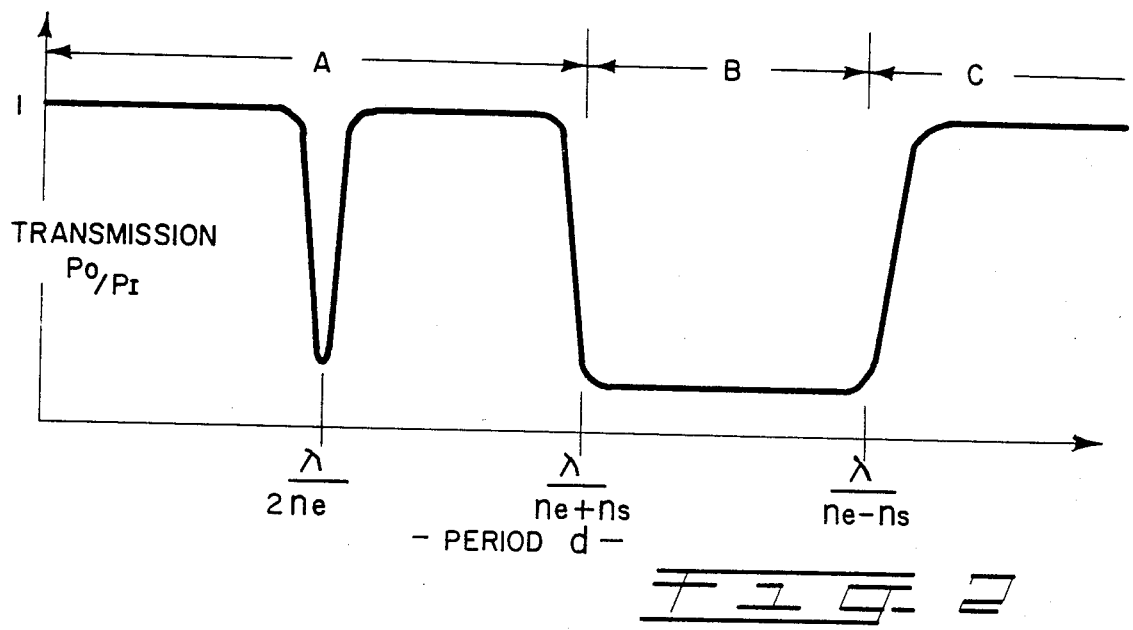
FIG. 2 is a graph showing the relationship between the transmission of a single mode of light energy through the optical waveguide of FIG. 1 and the period of the corrugations.

FIG. 2 is a graph, termed a transmission curve, showing a typical relationship between transmitted light power and period for a given mode and wavelength of propagated light through the filter of FIG. 1. The transmission curve shown in FIG. 2 is somewhat empirical and general, as the exact shape of the curve is not known at all points, and it is difficult to calculate the curve. However, the curve will be useful in explaining the operation of the mode filters fabricated according to the invention. The ordinate in FIG. 2 indicates the transmission of the filter in terms of output light power, $P_o$, divided by input power, $P_I$.

The transmission curve of FIG. 2 denotes the transmission characteristics of a filter region fabricated according to the invention for a single mode of propagation. If the waveguide within which the filter is comprised is capable of supporting modes having different mode numbers, such as $TE_0$ and $TE_1$, then the transmission curve will be more complex, as will be described more fully below. However, if the waveguide can support only differently polarized modes having the same mode numbers, such as $TE_0$ and $TM_0$ modes, the transmission curve for each mode will be shaped similarly to the curve shown in FIG. 2. As is well known, a waveguide can be fabricated to propagate certain modes of a given wavelength, $\lambda$, by choice of materials for the waveguide components having proper $n_f$ and $n_s$ at wavelength $\lambda$, and by proper choice of dimension $h$.

In region A where $d < \lambda/n_f + n_s$, transmission of the particular mode is substantially unity except in the region of the notch in the curve where $d = \lambda/2n_e$. This notch is physically caused by Bragg scattering in the backward direction. Thus, if a waveguide filter were fabricated with $d > \lambda/2n_e$, light of the particular mode propagated in the forward direction would essentially be reflected back along the waveguide as indicated by dotted arrow 15 in FIG. 1. In region B where $$\frac{\lambda}{n_e - n_s} < d < \frac{\lambda}{n_e - n_s}$$

light of the particular mode is scattered out of the guide, as indicated by arrow 16 in FIG. 1. The amount of light scattered, and, therefore, the transmission in region B, depends on the number of corrugation periods in the filtering region, and the depth of the corrugations. In region C, where $d = \lambda/n_e - n_s$, light of the particular mode will again be transmitted. However, the transmission characteristic in region C is not as clearly understood as in regions A and B.

Figure 3:
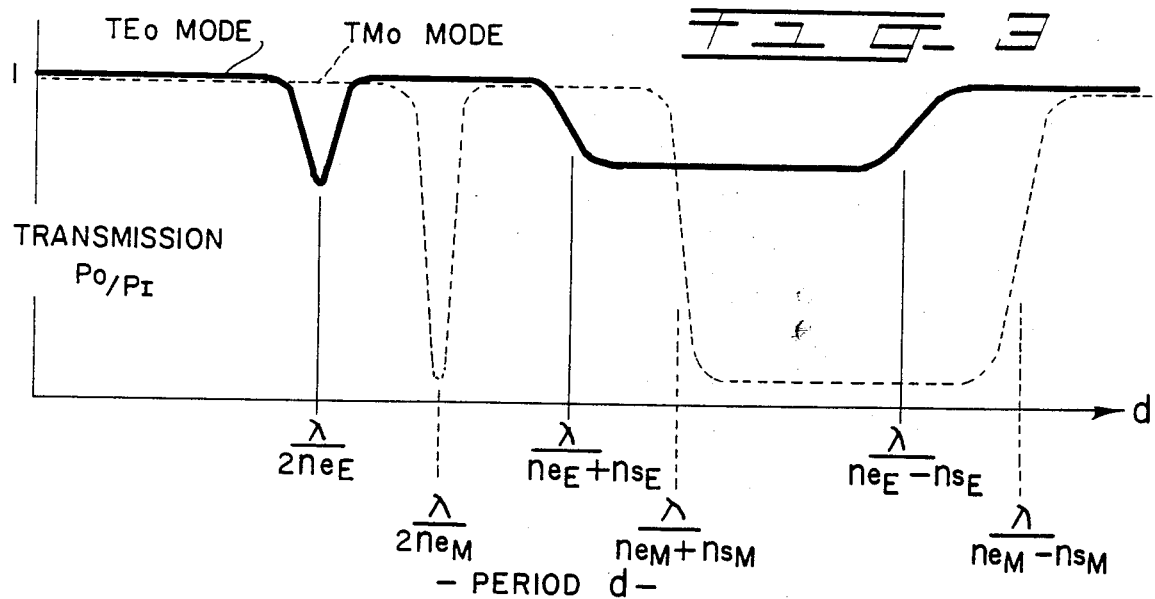
FIG. 3 is a graph similar to FIG. 2 showing the transmission of both $TE_0$ and $TM_0$ modes through the optical filter of FIG. 1.

FIG. 3 shows two transmission curves for a typical filter region such as shown in FIG. 1 in a waveguide capable of supporting both $TE_0$ and $TM_0$ modes. Since the effective refractive indexes for the two modes are different, similar features of the two transmission curves are displaced along the d axis. For example, the notch at $\lambda/2n_{e_M}$ for the $TM_0$ mode is displaced from the notch at $\lambda/2n_{e_E}$ for the $TE_0$ mode. Note that the variations in transmission for the $TM_0$ mode are shown to be greater in magnitude than corresponding variations in the $TE_0$ mode. The transmission curves in FIG. 3 are illustrative of a typical filter. Clearly, other filters are possible in which the transmission relationships may be altered.

From FIG. 3, it can be seen that a filter section fabricated with $d = \lambda/2n_{e_E}$ would attenuate the $TE_0$ mode somewhat but would pass the $TM_0$ mode substantially without attenuation. Conversely, a filter section fabricated with $d = \lambda/2n_{e_M}$ would attenuate the $TM_0$ mode significantly, but would pass the $TE_0$ substantially without attenuation. Therefore, by appropriate choice of $d$, a filter can be fabricated that will attenuate either the $TM_0$ or the $TE_0$ mode, passing the remaining mode substantially without attenuation. Since the relative amount of TE and TM energy pertain to the polarization of the propagated light, a filter that discriminates between TE and TM modes can be termed a polarization filter.

Referring back to FIG. 2, a filter fabricated with $d = \lambda/2n_e$ must be precisely made so that minimum transmission is achieved. A slight variation in $d$ from optimum can result in a large variation in transmission. However, if $d$ can be chosen within region B, the tolerance on d will not be as critical.

Referring again to FIG. 3, a satisfactory filter to scatter the $TM_0$ mode can be fabricated with d ranging between $\lambda/n_{e_M} + n_{s_M}$ and $\lambda/n_{e_M} - n_{s_M}$, because the transmission curve for the $TM_0$ mode indicates significantly lower transmission than the transmission curve for the $TE_0$ mode within this range of values of $d$.

To obtain greater differences between $n_{e_E}$ and $n_{e_M}$, optical film 12 can be isotropic and substrate 11 can be anisotropic. For example, substrate 11 could be a uniaxial crystal with its optical axis perpendicular to the plane of optical film 12. TE and TM modes would then be affected by different substrate refractive indexes $n_{s_E}$ and $n_{s_M}$. Similarly, optical film 12 could be made anisotropic, and substrate 11 isotropic, to achieve a greater difference between the effective refractive indexes of the TE and TM modes.

Figure 4:
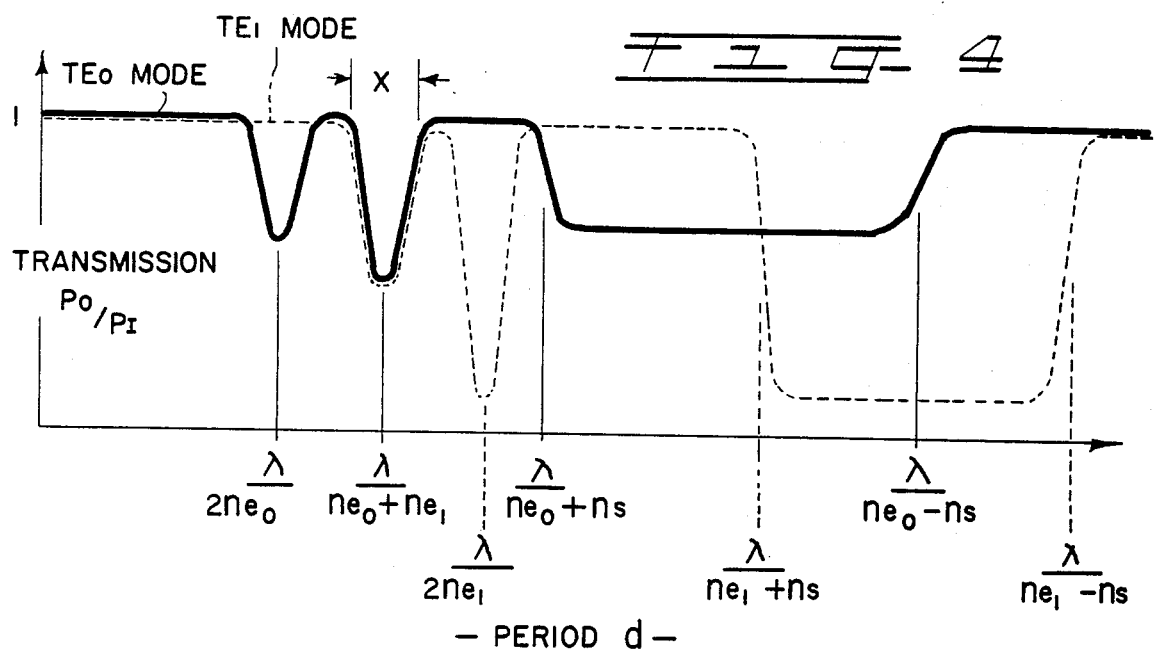
FIG. 4 is a graph similar to FIG. 2 showing the transmission of both $TE_0$ and $TE_1$ modes through the optical filter of FIG. 1.

FIG. 4 shows superimposed transmission curves for $TE_0$ and $TE_1$ modes in a filter of the type shown in FIG. 1. Of course, the optical waveguide incorporating the filter must be capable of supporting both $TE_0$ and $TE_1$ modes. Again, because of the shift in similar characteristics along the d axis between the $TE_0$ and $TE_1$ curves, filters can be fabricated in which period $d$ is chosen to attenuate one mode while passing the other mode substantially without attenuation. When distinguishing between two TE modes, or two TM modes, however, another factor must be considered. For example, in the filter region as shown in FIG. 1, light energy in the $TE_0$ mode can be transferred to the $TE_1$ mode, and vice versa, and the light energy so transferred will be propagated backward along the waveguide. This transfer is indicated at region X in FIG. 4, where corresponding notches in both transmission curves are shown. At the bottom of the notches, $d = \lambda/n_{e_0} + n_{e_1}$. Because of the similar attenuation of both modes in region X, it is impractical to construct filters having d in this region. However, filters at points where $$d = \frac{\lambda}{2n_{e_0}}.$$

-Continued $$d = \frac{\lambda}{2n_1}, \text{ or}$$

$$\frac{\lambda}{n_o + n_s} < d < \frac{\lambda}{n_1 - n_s}.$$

would be practical for the transmission curves shown.

Experiments have been performed to verify the operation of filters for separating $TE_0$, $TE_1$, $TE_2$ and $TE_3$ modes. Three structures for filtering TE modes were fabricated. Each structure comprised a film of Shipley AZ 1350 photoresist overlaid on a fused quartz substrate. A 3 by 3mm area of the surface of the film was corrugated to form a filtering region by exposing the photoresist to interfering beams from an Argon laser operating at the wavelength of $\lambda = 488$nm, and subsequently developing the photoresist. The film thickness h on two of the structures was 3.4 $\mu$, to support four modes: $TE_0$, $TE_1$, $TE_2$, and $TE_3$. The film thickness h on the remaining structure was 1.2 $\mu$, to support only two modes: $TE_0$ and $TE_1$. The films on one of the four-mode structures and the two-mode structure were exposed to the interfering laser beams so that $d$ was 0.386 $\mu$; the remaining four-mode structure was exposed to the interfering beam so that $d$ was 0.339 $\mu$. The corrugation depth after development of the photoresist was estimated to be between 100A and 500A.

Light from a Nd:YAG laser operating at a wavelength $\lambda = 1.06\mu$ was propagated through the filtering region at an input power $P_I$, and the power beyond the filtering region, $P_o$, was measured. The transmission ratios $P_o/P_I$ for these structures are summarized in Table I.

| h | Mode | $P_o/P_I$ $d = 0.386\mu$ | $P_o/P_I$ $d = 0.339\mu$ |
|---|---|---|---|
| 3.4$\mu$ | $TE_0$ | 1.00 | 0.9 |
|  | $TE_1$ | 0.24 | 0.8 |
|  | $TE_2$ | 0.24 | 0.2 |
|  | $TE_3$ | 0.03 | 0.3 |
| 1.2$\mu$ | $TE_0$ | 1.00 | — |
|  | $TE_1$ | 0.05 | — |

TABLE I

The marked difference between the transmission ratios for various modes can be noted. Also, the marked difference between the transmission ratios for the $TE_1$ and $TE_3$ modes for the two different values of $d$ can be noted. Clearly the experimental structures functioned as mode filters in diverting, and, therefore, attenuating the propagation of, higher order modes.

Figure 5:
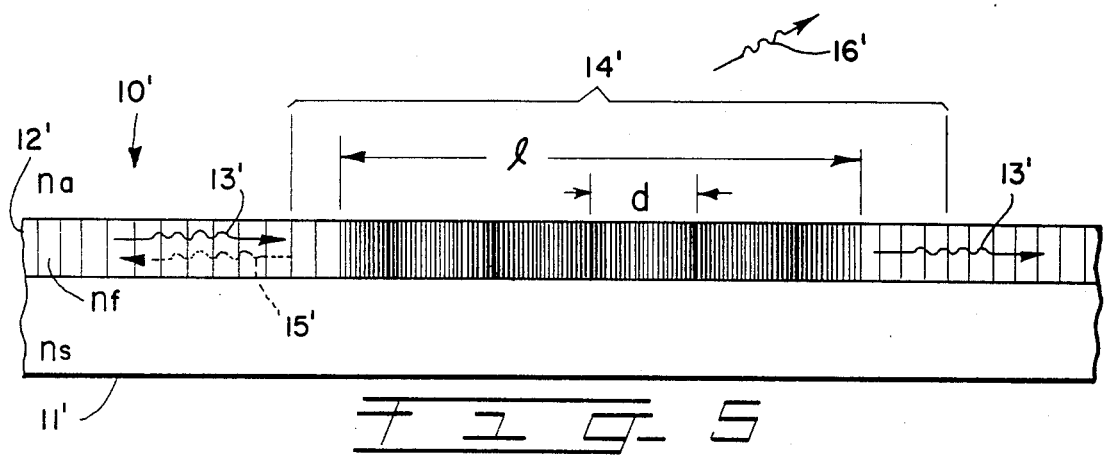
FIG. 5 is a cross-sectional view of a two-component planar optical waveguide having a filter section comprising an overlying layer having a periodically varying index of refraction.

An alternative waveguide filter structure is shown in FIG. 5. In FIG. 5, components of filter 10' are analogous to similar components of the filter shown in FIG. 1. Substrate 11' is overlaid with a film 12'. However, instead of a periodic variation comprising corrugating the surface of film 12', the index of refraction of film 12' is periodically varied in filter region 14'. This variation can be achieved by exposing a photosensitive film 12' to interfering laser beams in a similar manner to the fabrication of corrugated films described earlier. Other optical waveguide filters are possible in which the index of the substrate is periodically varied. Methods for fabricating a filter region having a periodically varying index of refraction are described more fully in copending application Ser. No. 385,270, noted above.

The variable-index filter of FIG. 5 operates in an analogous manner to the corrugated-surface filter of FIG. 1. Bragg backward scattering regions and out-of-waveguide scattering regions exist for the variable-index filter that are analogous to similar regions for the corrugated-surface filter. Transmission characteristics can be represented by transmission curves similar to those shown in FIGS. 2, 3 and 4. The amplitude of the variation in refractive index, $\delta$, is analogous to the corrugation depth $\Delta$. For both types of filters, the parameters $h$, $d$, $\Delta$ for corrugated-surface filters and $\delta$ for variable-index filters can be varied to change the characteristic transmission curves for the various propagation modes.

Figure 6:
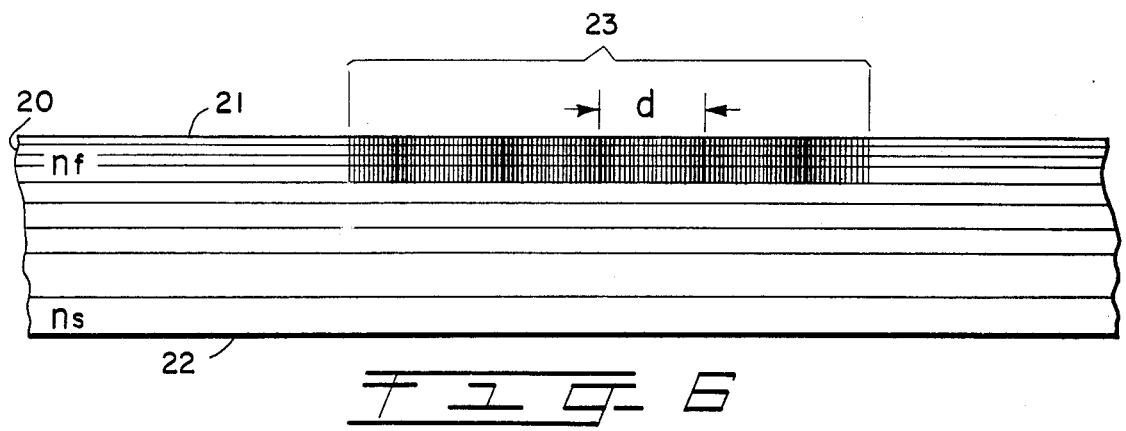
FIG. 6 is a cross-sectional view of a one-component planar waveguide having a filter section comprising a periodically varying index of refraction.

FIG. 6 is a cross-sectional view of a one-component planar optical waveguide 20 having a gradient in the refractive index from top surface 21 to bottom surface 22. If the refractive index is $n_f$ adjacent to top surface 21 and $n_s$ adjacent to bottom surface 22, and $n_f > n_s$, light energy will tend to propagate along the top surface. A periodic variation in the refractive index along the propagation axis is superimposed on the index gradient in filter region 23. The periodic variation is extended to the depth necessary to affect the region where the propagating field of the mode to be diverted by the filter region substantially exists. The operation of waveguide 20 is analogous to the operation of waveguide 10' in FIG. 5.

One method of achieving superimposed varying refractive indexes, such as are necessary in the waveguides of FIG. 6, is bombarding the waveguide with ions having different energies to vary the refractive index at different depths, and in appropriate patterns to obtain the periodic variations in filter region 23.

A filter region could also be fabricated in a waveguide having a gradient in the refractive index from one surface to an opposing surface by corrugating the surface adjacent to the highest index of refraction.

FIGS. 7, 8 and 9 illustrate segments of two-component fiber optic waveguides utilizing the principles of the invention. FIG. 7 shows a fiber optic waveguide 30 having core 31 and cladding 32, analogous to optical film 12 and substrate 11, respectively, in FIG. 5. In filter region 33, the refractive index $n_f$ of core 31 is varied periodically with a period $d$. Again, for proper waveguide operation, $n_f > n_s$.

FIG. 8 shows a fiber optic waveguide 40 having core 41 and cladding 42. In filter region 43, the refractive index $n_s$ of cladding 42 is varied periodically with a period $d$. Once again $n_f > n_s$ for proper waveguide operation.

The operation of the filter region 33 in FIG. 7 is completely analogous to the operation of filter region 14, in the waveguide structure of FIG. 5. Transmission curves for filter region 43 would indicate Bragg scattering ranges and out-of-waveguide scattering ranges for each mode that can be propagated through the waveguide and the filter. Similarly, the operation of filter region 43 in FIG. 8 is analogous to the operation of a filter region in a waveguide structure similar to that shown in FIG. 5, but where the periodic refractive index variation is in substrate 11' instead of in optical film 12'.

FIG. 9 shows a filter region according to the invention in a fiber optic waveguide comprising a single component 50 having a radial gradient in the refractive index. That is, the refractive index decreases from $n_f$ at the axis of the waveguide to $n_s$ adjacent to the surface of the waveguide. In filter region 53, the periodic variation can be provided by deeply corrugating the waveguide as shown in FIG. 9, or, alternatively, by periodically varying the refractive index along the axis of the waveguide. Light energy will tend to propagate through the portion of the waveguide having the highest refractive index, therefore, the operation of waveguide 50, and its comprised filter region, will be analogous to the operation of the structure shown in FIG. 6.

The operation of the optical waveguide filters described above can be briefly summarized by considering that light energy in a given mode propagates in a given portion of a waveguide, where the propagation field of the given mode substantially exists. A periodic variation that comprises a filter region in the waveguide must extend to the portion of the waveguide where a given mode is being propagated to affect that mode. Therefore, for effective diversion of an unwanted mode, the periodic variation of a filter region, according to the invention, must extend into the region of the propagating field of the unwanted mode.

Further details on the analysis of periodic waveguides that may be helpful in understanding the theory of their operation can be found in the articles: "Period Dielectric Waveguides," By F. W. Dabby, A. Kestenbaum, and U. C. Paek, *Optics Communications*, Vol. 6, No. 2, October 1972, pp. 125–130; "High Frequency Cutoff Periodic Filters," by F. W. Dabby, M. A. Saifi, and A. Kestenbaum, *Applied Physics Letters*, Vol. 22, No. 4, 15 Feb. 1973, pp. 190–191; "Coupled Mode Theory for Guided Wave Optics," by Amnon Yariv, *IEEE Journal of Quantum Electronics*, Vol. QE-9, No. 9, September 1973 pp. 919–933; and "Analysis of Optical Propagation in a Corrugated Dielectric Waveguide," by Kyohei Sakuda and Amnon Yariv, *Optics communications*, Vol. 8, No. 1, May 1973, pp. 1–4.

One skilled in the art may make changes and modifications to the embodiments of the invention disclosed herein, and may devise other embodiments, without departing from the spirit and scope of the invention.

What is claimed is:

1. A method of mode filtering light of a given frequency propagated through an optical waveguide having a refractive index $n_f$ in a first portion of a cross section thereof and a refractive index $n_s$ in a second portion of the cross section, where $n_f > n_s$, which comprises:

selecting and providing variation in a region of the optical waveguide extending along the propagation axis of the waveguide to divert an unwanted mode of the light from forward propagation, the period of the variation being less than $\lambda/n_r - n_s$, where $\lambda$ is the free-space wavelength of the light and $n_r$ is the effective refractive index in the waveguide of the unwanted mode, the periodic variation extending to at least a portion of the cross section of the waveguide where the field of the unwanted mode substantially exists.

2. The method according to claim 1 wherein said periodic variation comprises a periodic variation in the refractive index of one of the portions.

3. The method according to claim 1 wherein said periodic variation comprises a corrugation in a surface of the waveguide.

4. The method according to claim 1 wherein the period d is greater then $\lambda/n_r + n_s$ and the unwanted mode is scattered out of the waveguide.

5. The method according to claim 1 wherein the period d substantially equals $\lambda/2n_r$ and the unwanted mode is reflected back along the waveguide.

6. A method of mode filtering light of a given frequency propagated through an optical waveguide having an optical layer supported on a substrate, which comprises selecting and providing a periodic variation in a region of the optical layer along the propagation axis of the waveguide to divert an unwanted mode of light from forward propagation, the period d of the variation being less than $\lambda/n_r - n_s$ where $\lambda$ is the free space wavelength of the light, $n_r$ is the effective refractive index in the waveguide of the unwanted mode, and $n_s$ is the refractive index of the substrate for the unwanted mode.

7. The method according to claim 6 wherein said periodic variation is comprised in the refractive index of the optical layer.

8. The method according to claim 6 wherein said periodic variation comprises a corrugation in a surface of the optical layer.

9. The method according to claim 6 wherein the period d is greater than $\lambda/n_r + n_s$ and the unwanted mode is scattered out of the waveguide.

10. The method according to claim 6 wherein the period d substantially equals $\lambda/2n_r$ and the unwanted mode is reflected back along the waveguide.

11. A method of mode filtering light of a given frequency propagated through a fiber optic waveguide comprising a core having a refractive index $n_f$ and a cladding having a refractive index $n_s$, where $n_f > n_s$, which comprises:

selecting and providing a periodic variation in the refractive index of a region of the core along the axis of the waveguide to divert an unwanted mode of the light from forward propagation, the period d of the index variation being less than $\lambda/n_r - n_s$ where $\lambda$ is the free-space wavelength of the light, and $n_r$ is the effective refractive index in the waveguide of the unwanted mode.

12. The method according to claim 11 wherein the period d is greater than $\lambda/n_r + n_s$ and the unwanted mode is scattered out of the waveguide.

13. The method according to claim 11 wherein the period d substantially equals $\lambda/2n_r$ and the unwanted mode is reflected back along the waveguide.

14. A method of mode filtering light of a given frequency propagated through a fiber optic waveguide comprising a core having a refractive index $n_f$ and a cladding having a refractive index $n_s$, where $n_f > n_s$, which comprises:

selecting and providing a periodic variation in the refractive index of a region of the cladding along the axis of the waveguide to divert an unwanted mode of the light from forward propagation, the period d of the index variation being less than $\lambda/n_r - n_s$ where $\lambda$ is the free-space wavelength of the light and $n_r$ is the effective refractive index in the waveguide of the unwanted mode.

15. The method according to claim 14 wherein the period d is greater than $\lambda/n_r + n_s$ and the unwanted mode is scattered out of the waveguide.

16. The method according to claim 14 wherein the period d substantially equals $\lambda/2n_r$ and the unwanted mode is reflected back along the waveguide.

17. A method of mode filtering light of a given frequency propagated through a fiber optic waveguide having a decreasing radial gradient in refractive index from the axis of the waveguide to the surface of the waveguide, which comprises:

selecting and providing a periodic variation in a region of the waveguide along the propagation axis of the waveguide to divert an unwanted mode of light from forward propagation, the period of the variation being less than $\lambda/n_r - n_s$ where $\lambda$ is the free-space wavelength of the light, $n_r$ is the effective refractive index in the waveguide of the unwanted mode, and $n_s$ is the refractive index at the surface of the waveguide, the periodic variation extending to a portion of the cross section of the waveguide where the field of the unwanted mode substantially exists.

18. The method according to claim 17 wherein said periodic variation comprises a periodic variation in the index of refraction.

19. The method according to claim 17 wherein said periodic variation comprises a corrugation in the surface of the waveguide.

20. The method according to claim 17 wherein the period $d$ is greater than $\lambda/n_r + n_s$ and the unwanted mode is scattered out of the waveguide.

21. The method according to claim 17 wherein the period $d$ substantially equals $\lambda/2n_r$ and the unwanted mode is reflected back along the waveguide.

22. A method of filtering TE and TM modes of light transmitted through an optical waveguide having an optical layer supported on a substrate, which comprises selecting and providing a periodic variation in a region of the optical layer along the propagation axis of the waveguide to scatter one of the modes of light out of the waveguide, the period 64 d of the variation being less than $\lambda/n_r - n_s$ and greater than $\lambda/n_r + n_s$, where $\lambda$ is the free-space wavelength of the light propagating through the waveguide, $n_r$ is the effective refractive index in the waveguide of the mode to be scattered, and $n_s$ is the refractive index of the substrate for the unwanted mode.

23. The method according to claim 22 wherein said periodic variation comprises a periodic variation in the refractive index of said optical layer.

24. The method according to claim 22 wherein said periodic variation comprises a corrugation in the surface of said optical layer.

25. The method according to claim 22 wherein both said substrate and said optical layer are isotropic.

26. The method according to claim 22 wherein said optical layer is isotropic and said substrate is anisotropic.

27. The method according to claim 22 wherein said optical layer is anisotropic and said substrate is isotropic.

28. A method of mode filtering light propagated substantially along a first surface of a planar optical waveguide having a gradient in the refractive index from $n_f$ adjacent the first surface to $n_s$ adjacent an opposing second surface, $n_f > n_s$, which comprises:

selecting and providing a periodic variation in a region of the waveguide along the propagation axis of the waveguide to divert an unwanted mode of the light from forward propagation, the period of the variation being less than $\lambda/n_r - n_s$ where $\lambda$ is the free-space wavelength of the light, and $n_r$ is the effective refractive index in the waveguide of the unwanted mode, the periodic variation extending to at least a portion of the cross section of the waveguide where the field of the unwanted mode substantially exists.

29. The method according to claim 28 wherein said periodic variation comprises a periodic variation in the refractive index.

30. The method according to claim 28 wherein said periodic variation comprises a corrugation in the surface of the waveguide.

31. The method according to claim 28 wherein the period d substantially equals $\lambda/2n_r$ and the unwanted mode is reflected back along the waveguide.

32. The method according to claim 28 wherein the period d is greater than $\lambda/n_r + n_s$ and the unwanted mode is scattered out of the waveguide.

* * * * *

UNITED STATES PATENT OFFICE
CERTIFICATE OF CORRECTION

Patent No. 3,891,302     Dated June 24, 1975

Inventor(s) F. W. Dabby and A. Kestenbaum

It is certified that error appears in the above-identified patent and that said Letters Patent are hereby corrected as shown below:

In the specification, Column 1, line 8, "method" should read --methods--. Column 2, line 64, "$n_2$, $n_f$, $n_a$," should read --$n_s$, $n_f$, $n_a$,--. Column 3, line 8, "e, d, $\Delta$ ," should read --$\ell$, d, $\Delta$ ,--; line 44, "$d > \lambda/2n_e$" should read --$d = \lambda/2n_e$--; line 58, "$d = \lambda/n_e - n_s$" should read --$d > \lambda/n_e - n_s$--. Column 4, line 17, "amount" should read --amounts--. Column 7, line 16, "propagation" should read --propagating--.

In the claims, Column 7, line 51, "providing variation" should read --providing a periodic variation--. Column 9, line 39, "64 d" should read --d--.

Signed and Sealed this ninth Day of September 1975

[SEAL]

Attest:

RUTH C. MASON
Attesting Officer

C. MARSHALL DANN
Commissioner of Patents and Trademarks